J. C. & J. A. DORAN.
FASTENER FOR SOFT COLLARS.
APPLICATION FILED MAR. 5, 1912. RENEWED MAR. 10, 1913.
1,059,353.
Patented Apr. 22, 1913.
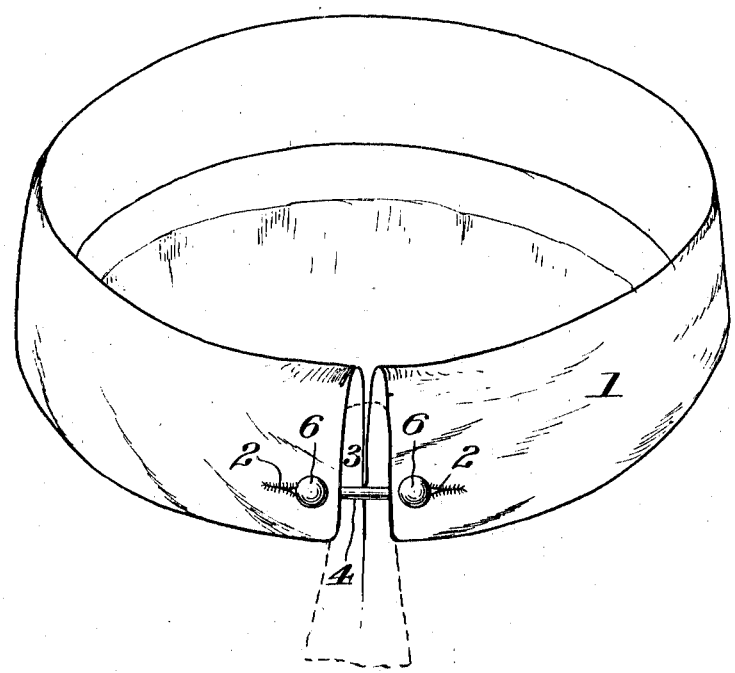
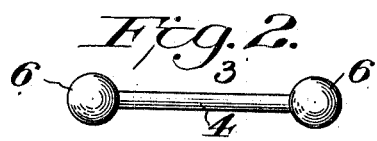
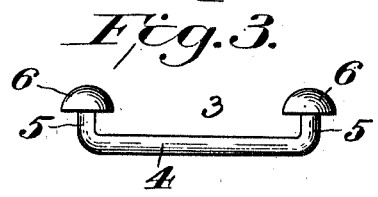
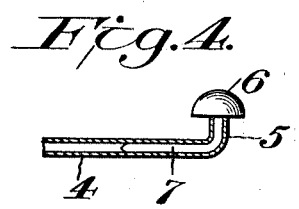
WITNESSES
C. N. Walker,
Lillie M. Perry.
INVENTORS
James C. Doran
James A. Doran
by W. N. Finckel
Atty

UNITED STATES PATENT OFFICE.

JAMES C. DORAN AND JAMES A. DORAN, OF PROVIDENCE, RHODE ISLAND.

FASTENER FOR SOFT COLLARS.

1,059,353.  Specification of Letters Patent.  Patented Apr. 22, 1913.

Application filed March 5, 1912, Serial No. 681,709. Renewed March 10, 1913. Serial No. 753,419.

*To all whom it may concern:*

Be it known that we, JAMES C. DORAN and JAMES A. DORAN, citizens of the United States, residing at Providence, in the county of Providence and State of Rhode Island, have invented a certain new and useful Improvement in Fasteners for Soft Collars, of which the following is a full, clear, and exact description.

The object of this invention is to provide a simple and durable construction of the link-like fasteners for connecting the ends of the turned-over portions of so-called "soft collars" or unstarched collars, for shirts, shirt-waists and the like; although the fastener may be used for other purposes. Such fasteners comprise a pair of button-like heads connected by various means.

The present invention uses the heads and mounts them upon pins or shanks, and these pins or shanks are inserted in the opposite ends of a tube, and the ends of the tube together with the pins or shanks therein are bent at an angle to the body of the tube, so that the heads are presented at the proper angle to the tube for use in the buttonholes of the collar and in addition are permanently secured to the tube, all as we will proceed now more particularly to explain and finally claim.

In the accompanying drawings illustrating the invention, in the several figures of which like parts are similarly designated, Figure 1 is a perspective view of a conventional "soft collar" with our fastener applied. Fig. 2 is a plan view, and Fig. 3 is a side elevation of the fastener detached. Fig. 4 is a sectional elevation, on a larger scale, of one end of the fastener. Fig. 5 shows the two heads in elevation and the tube in section ready to be assembled.

The collar 1, has the buttonholes 2 in opposite edges of its turned-over member, as usual, and to these buttonholes is applied the fastener 3 to connect these turned over ends and hold up the collar in proper position about the wearer's neck.

The fastener comprises a tube 4 with ends 5 bent up substantially at right angles to the body of the tube and sustaining the button-heads 6. These button-heads may be of any material, and they are provided with pins or shanks 7, or other means which are inserted in opposite ends of the tube while they and the tube are straight, as indicated in Fig. 5, and then the ends of the tube, with the pins or shanks inserted therein, are bent as indicated in Fig. 4, so that the button-heads and their pins or shanks or other insertible medium, are permanently connected with the tube.

By this construction soldering is avoided, and a very simple, strong and efficient fastener is produced, at low cost of manufacture. It is possible also to use a great variety of materials for the heads. Open or seamless tubing or hollow wire may be used for the connecting medium.

What we claim is:—

1. A fastener for soft collars and the like, comprising headed pins and a connecting tube in the ends of which the headed pins are placed, said pins and tube bent to unite them.

2. A fastener for soft collars and the like, having heads provided with pins and a connecting tube in the ends of which said pins are inserted, the ends of the tube and the adjacent portions of the pins being bent at an angle to the body of the tube.

In testimony whereof we have hereunto set our hands this sixteen day of February A. D. 1912.

JAMES C. DORAN.
JAMES A. DORAN.

Witnesses:
PATRICK CARTER,
MAE H. GIBLIN.